UNITED STATES PATENT OFFICE.

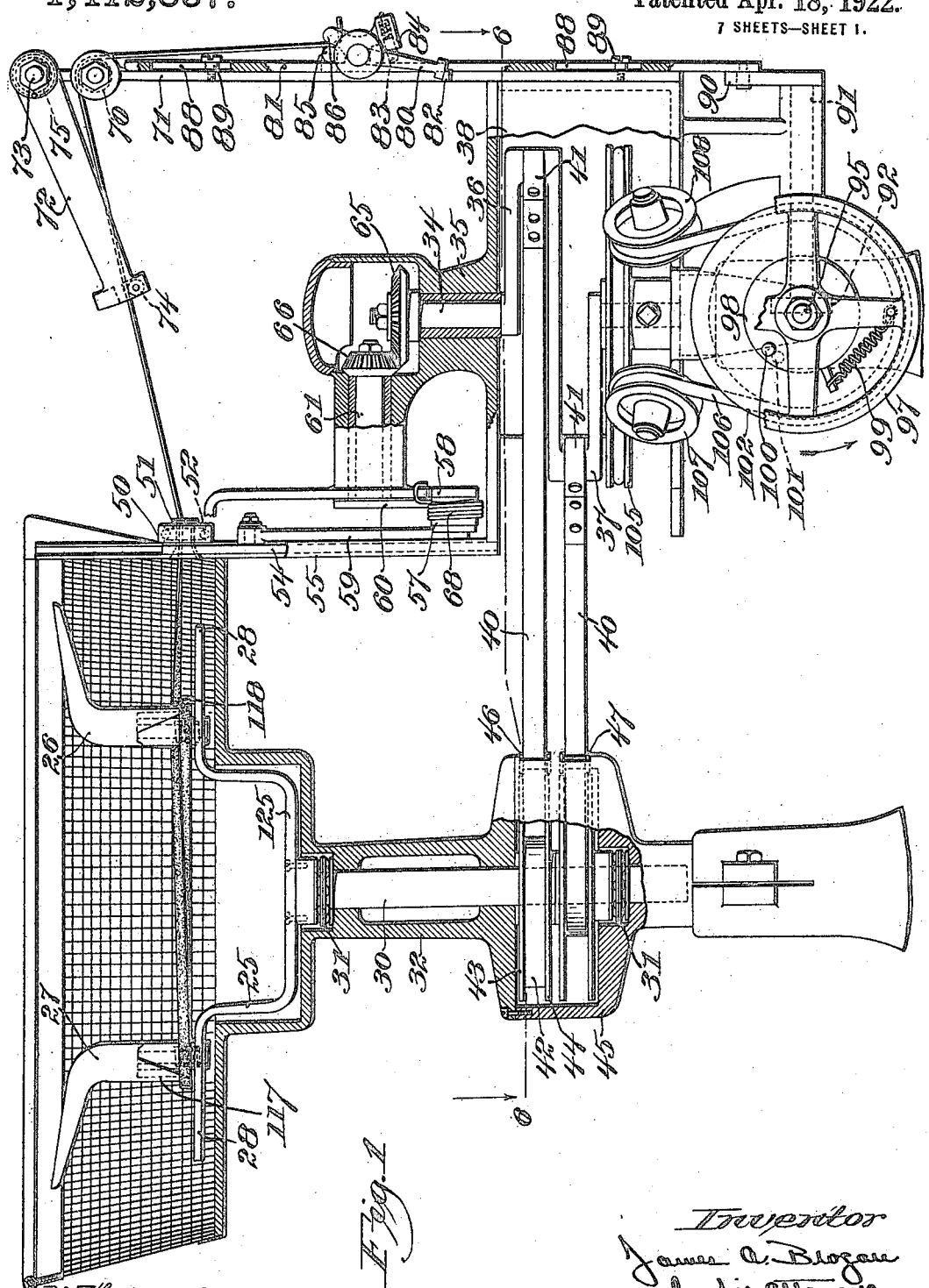

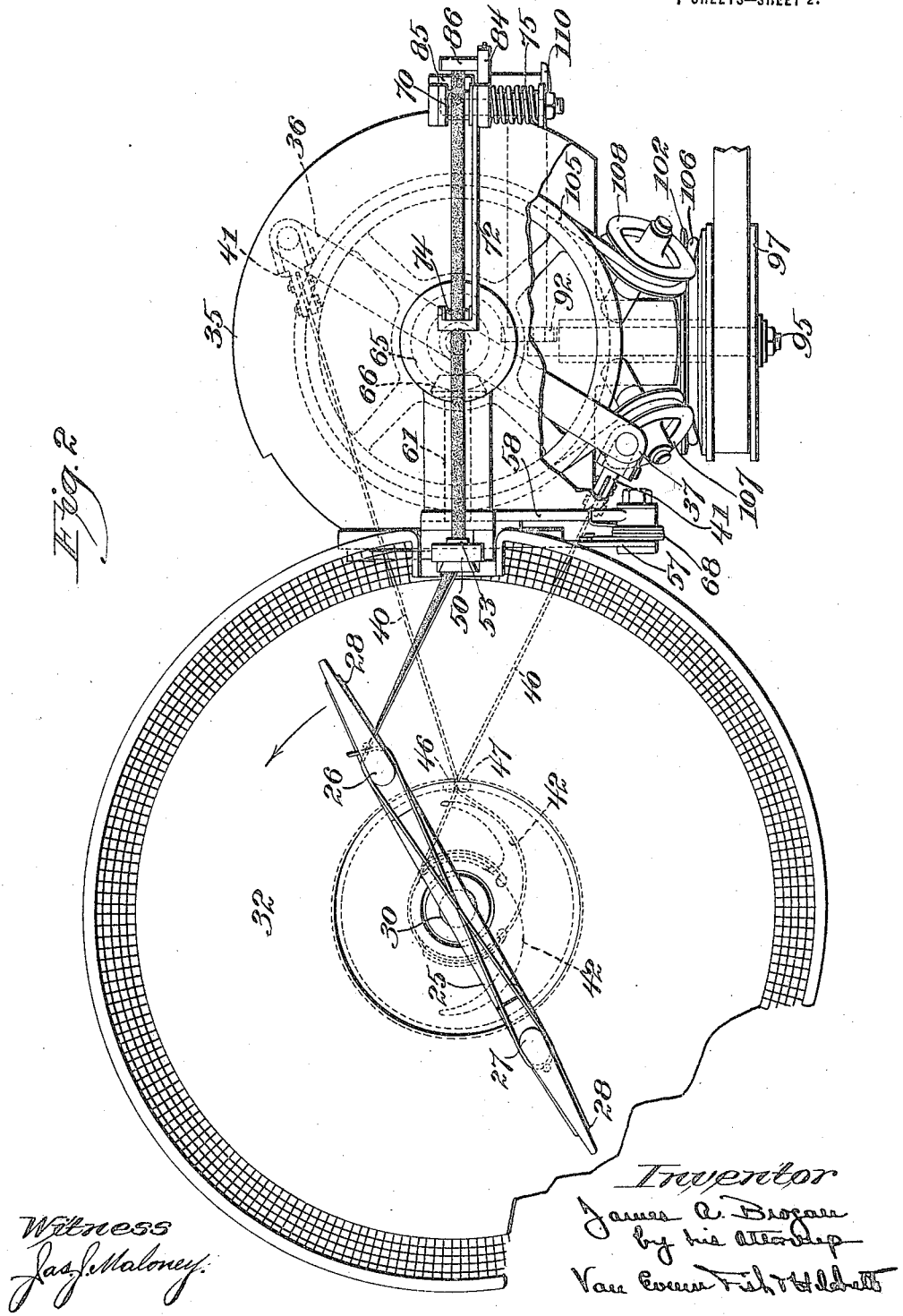

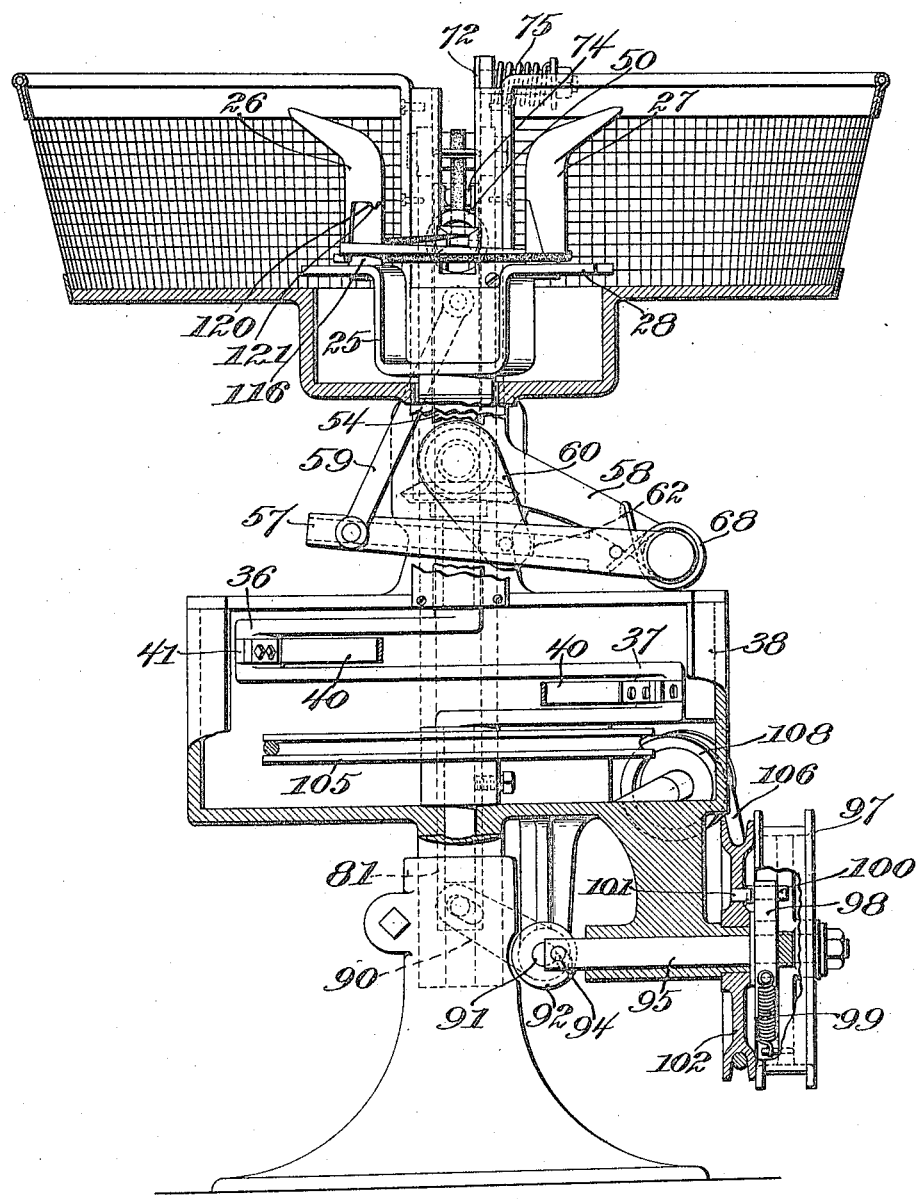

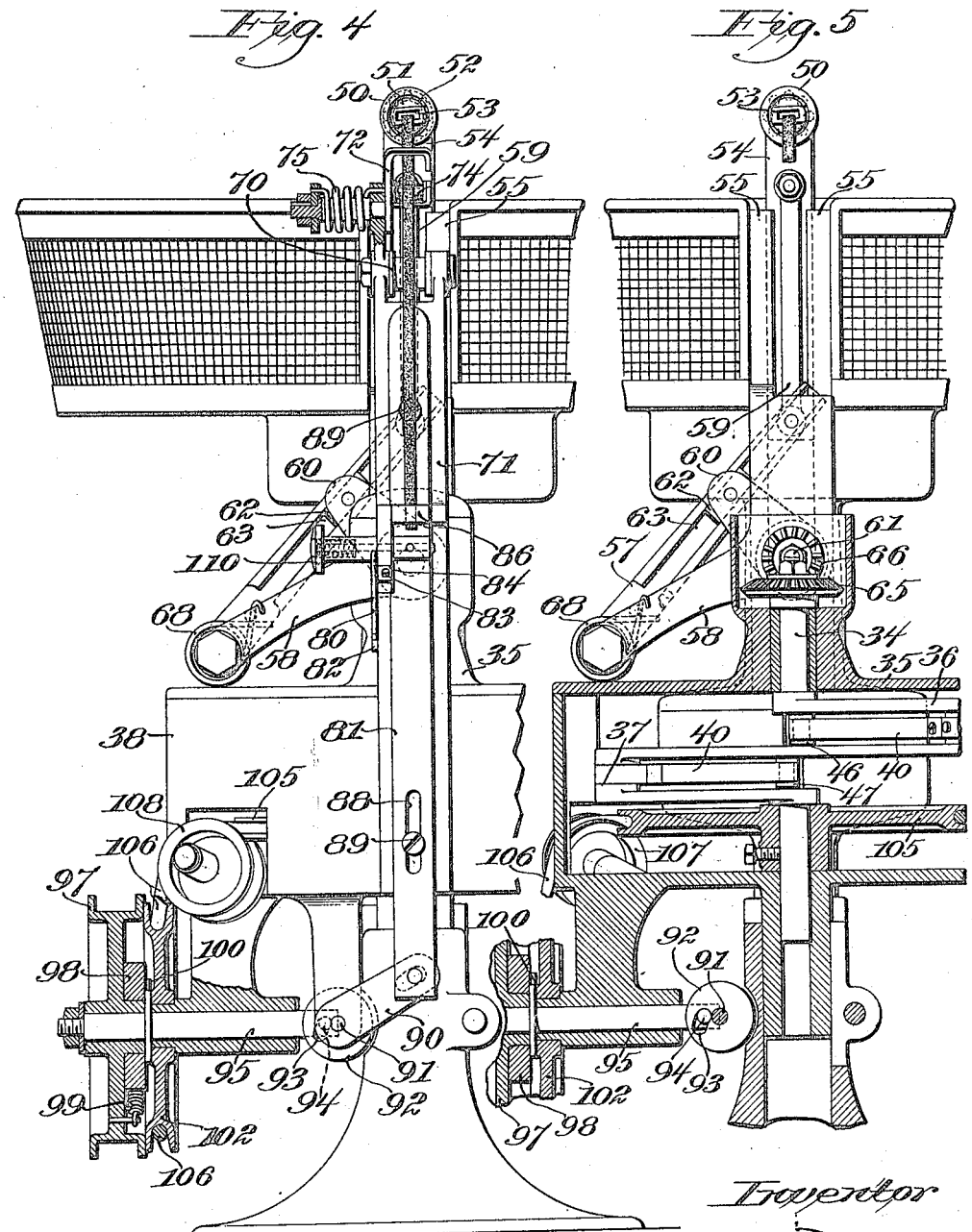

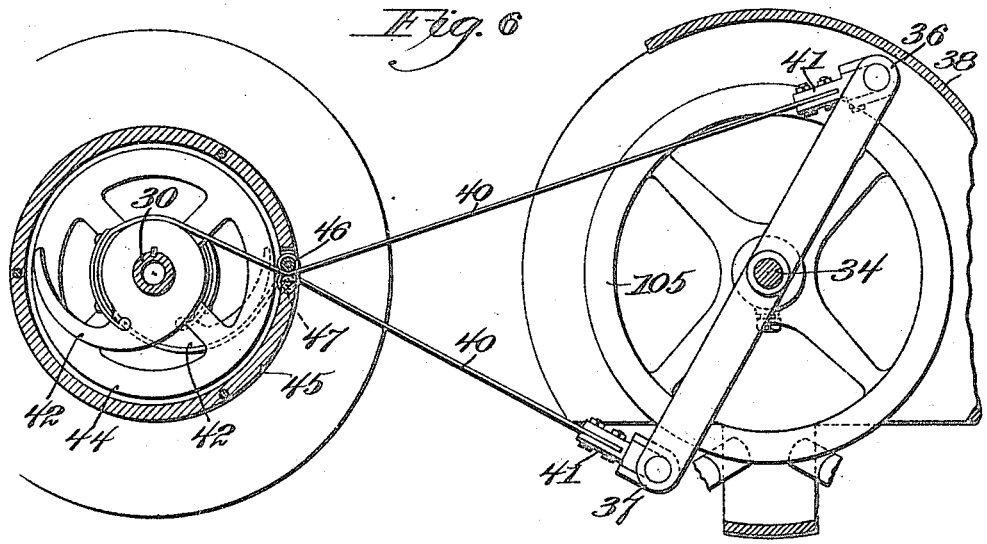
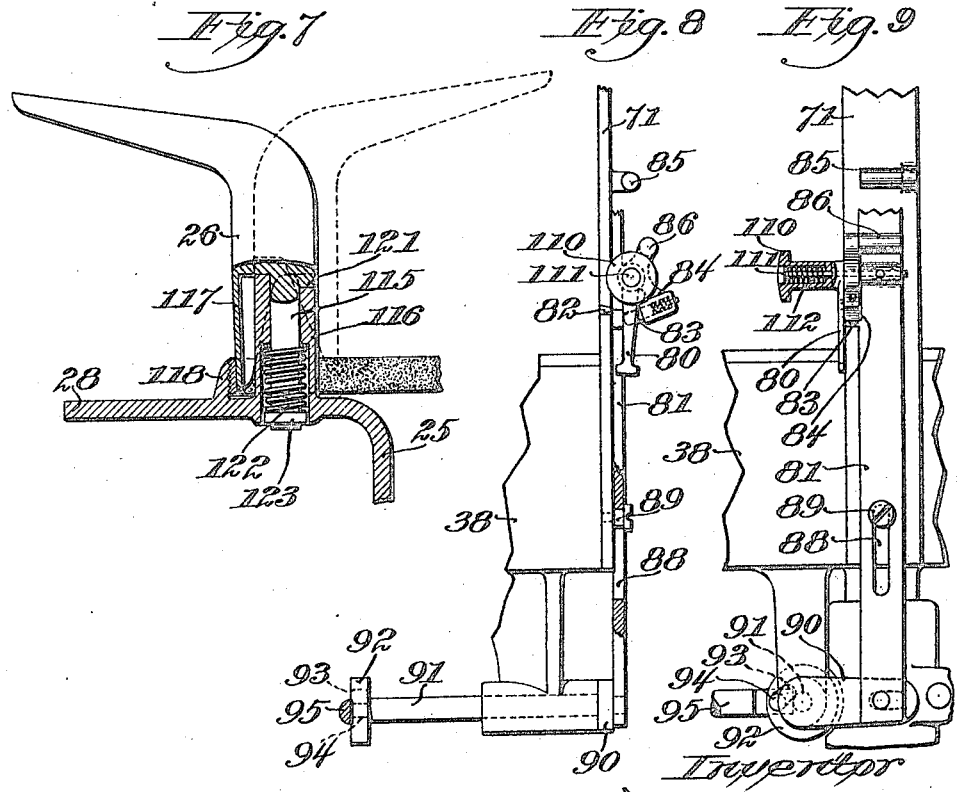

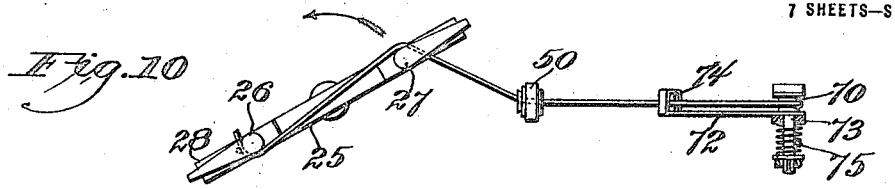
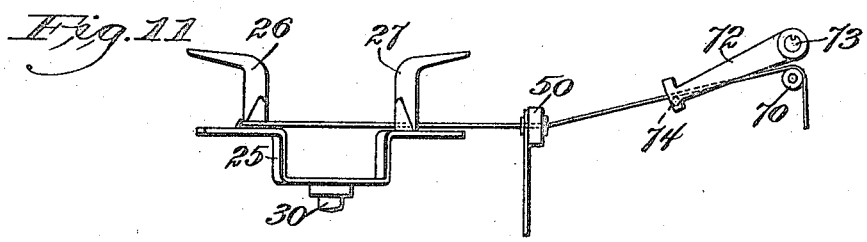
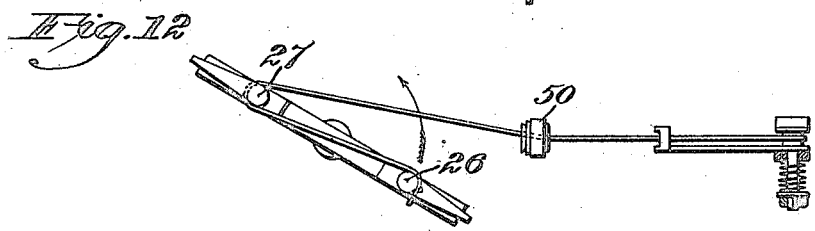
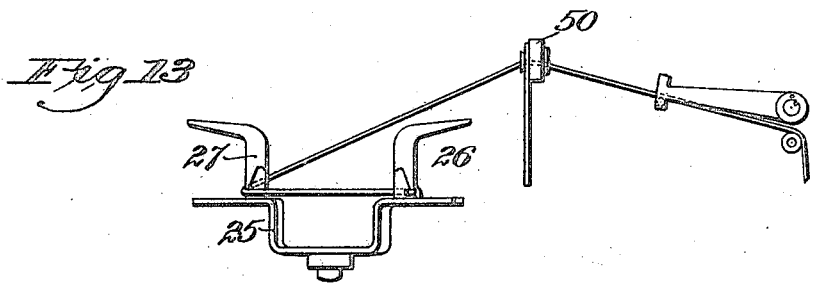
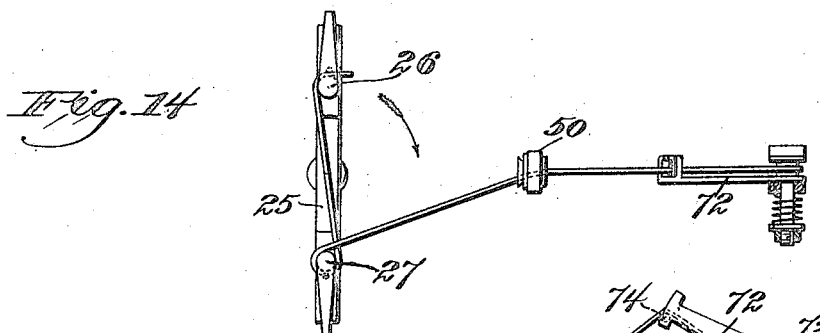
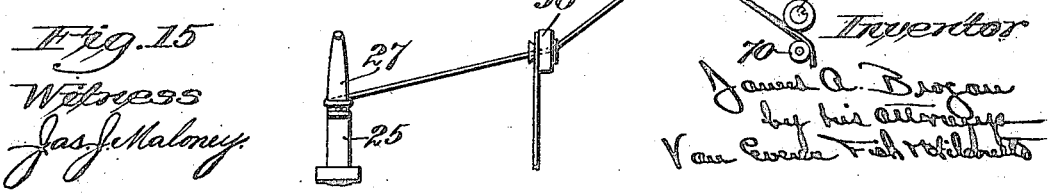

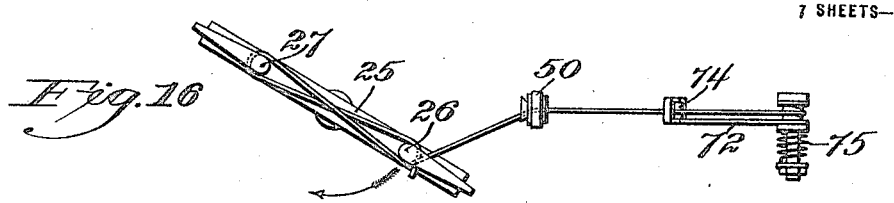
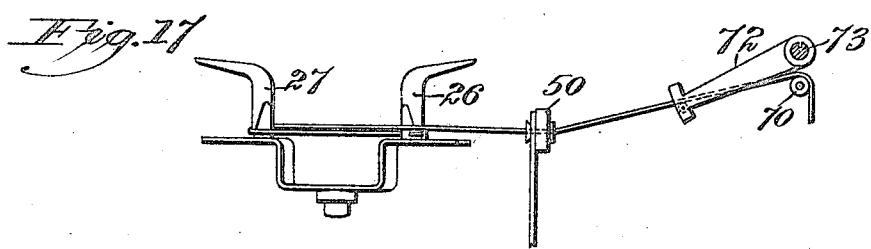
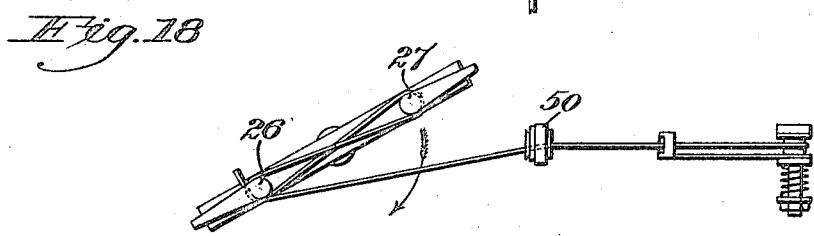
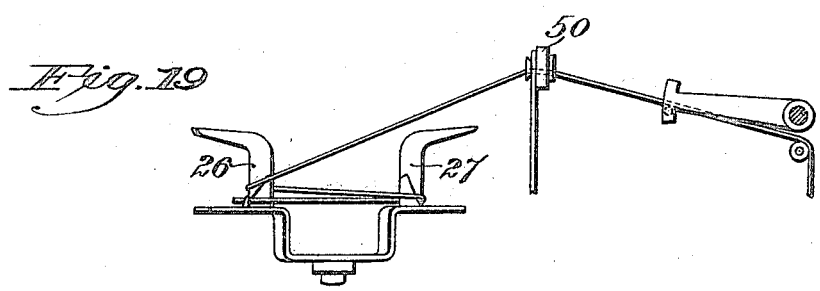
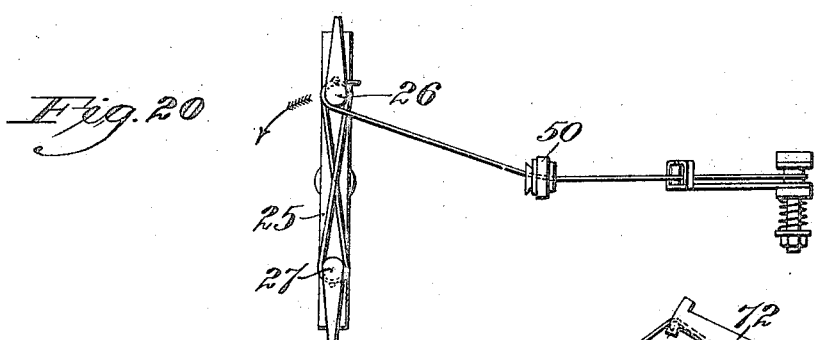
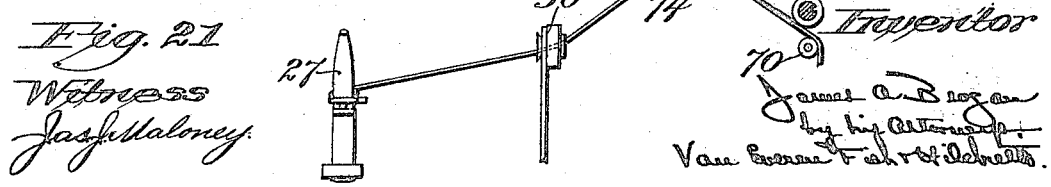

JAMES A. BROGAN, OF LAWRENCE, MASSACHUSETTS, ASSIGNOR TO UNITED SHOE MACHINERY CORPORATION, OF PATERSON, NEW JERSEY, A CORPORATION OF NEW JERSEY.

WELT-WINDING MACHINE.

1,412,837.   Specification of Letters Patent.   Patented Apr. 18, 1922.

Application filed April 27, 1918.   Serial No. 231,205.

*To all whom it may concern:*

Be it known that I, JAMES A. BROGAN, a citizen of the United States, residing at Lawrence, in the county of Essex and State of Massachusetts, have invented certain new and useful Improvements in Welt-Winding Machines; and I do hereby declare the following to be a full, clear, and exact description of the invention, such as will enable others skilled in the art to which it appertains to make and use the same.

The present invention relates to winding machines and more particularly to machines of this character adapted to wind a strip of welting for use in the manufacture of Goodyear welt shoes.

It is customary to thoroughly temper the strip of welting in order to render it pliable and facilitate its application to the boot or shoe and accordingly it is desirable that the hank of welting may be in such a form that the tempering liquid can readily permeate all portions of the welting and yet be sufficiently compact to be easily handled. It has been found that if the hank of welting is made up of a series of superposed convolutions each having the form of a figure 8 it is readily permeated by the tempering liquid and at the same time has the requisite compactness and may be handled readily without disarranging or tangling the convolutions.

One object of the present invention is to provide a machine which is capable of producing a hank of welting having this characteristic form and accordingly with this object in view a feature of the invention contemplates the provision of means for supporting the hank of welting, together with means for laying upon the support a series of superposed convolutions each having the form of a figure 8.

Another object of the invention is to provide mechanism for automatically stopping the winding machine when the end of the strip of welting to be wound is reached. To this end a further feature of the invention consists in the combination with driving mechanism of a pair of guide members between which the strip of welting passes and operative connections for rendering the driving mechanism inoperative when the guiding members are permitted to move toward one another due to the passage of the strip of welting from between the members.

It is to be understood that certain new and useful features of the invention are capable of embodiment in machines other than those employed for winding a strip of welting and these features or any or all of the features are not to be considered as limited to this type of machine except as defined in the claims.

In the accompanying drawings illustrating the preferred form of the invention, Figure 1 represents a side elevation partly in section of a machine embodying the several features of the invention; Fig. 2 is a plan view of the machine shown in Fig. 1; Fig. 3 is an end elevation partly in section of the machine shown in Fig. 1; Fig. 4 is a detail showing a partial elevation of the machine and illustrating the mechanism for reciprocating the welt guide and for automatically stopping the machine; Fig. 5 is a detail illustrating an elevation partly in section of the mechanism for reciprocating the welt guide and for oscillating the reel; Fig. 6 is a cross section on the line 6—6 of Fig. 1 and illustrates the mechanism for rotating the reel in opposite directions; Fig. 7 is a detail showing one of the arms of the reel; Fig. 8 is detail illustrating the throw-out latch in the position which it assumes when the clutch is rendered inoperative; Fig. 9 is a detail illustrating a front elevation partly in section of the throw-out latch and connected mechanism shown in Fig. 8; and Figs. 10 to 21, inclusive, are partial diagrammatic views illustrating the successive steps in the operation of forming the hank of welting.

In the illustrated embodiment of the invention a hank of welting is wound upon a two-arm reel in the form of a figure 8. This reel is rotated alternately in opposite directions during the winding operation and at the same time the reel and a cooperating welt guide are relatively actuated in the direction of the axis of the reel to periodically move the strip of welting out of the path of an arm when moved in one direction and to cause the strip of welting to be engaged by the arm when moved in the opposite direction.

The winding reel, as shown clearly in

Fig. 1, comprises a support 25 having a pair of arms or posts 26 and 27 mounted thereon and each having an out-turned end cooperating with the extended portions 28 of the base to retain the hank of welting in place on the reel. The base 25 is secured to the upper end of a shaft 30 journaled upon antifriction bearings 31 within a head 32. The reel is actuated by a crank shaft 34 journaled in a second head 35 and having a pair of oppositely disposed cranks 36 and 37 enclosed within a housing 38 and designed through suitable connections to rotate the reel shaft 30 alternately in opposite directions. To this end each of the cranks is connected with the shaft 30 through a strap 40 secured at one end to a clamping head 41 pivoted upon the crank and wound at its opposite end about the shaft 30. In order to ensure a uniform rotation of the reel shaft 30 irrespective of the angular position of the cranks the end of each strap 40 is adapted to be wound upon a compensating cam 42 which is provided with upper and lower flanges 43 and 44 to ensure the proper location of the strap relative thereto. As will be evident from the drawings, more particularly Figure 2, each of these cams provides virtually a hub of varying diameter upon which the strap is wound designed properly with relation to the varying angularity of the driving cranks 36 and 37 so that the rotation communicated to the reel by these cranks is uniform. These cams are contained within a housing 45 formed in the head 32 and the straps are respectively guided on to the cams by upper and lower guide rolls 46 and 47 journaled in the housing and engaging with opposite sides of the strap.

The application of the welt strip to the reel is controlled by a welt guide 50 having a throat piece 51 swiveled thereon in antifriction bearings indicated at 52 and provided with a throat 53 of rectangular cross section through which the strip of welding passes. The welt guide is provided with an elongated slide 54 received in vertical ways 55 extending from the housing 35. The welt guide is reciprocated in the direction of the axis of the reel to move the strip of welting periodically out of the path of one of the arms of the reel and to thereafter return the strip of welting into the path of the arm when the direction of rotation of the reel is reversed. To this end the slide is actuated by an oscillating arm 57 fulcrumed at one end upon a stationary arm 58 and connected at its opposite end with the slide through a pitman 59. The arm 57 is rocked by a rotating crank arm 60 secured to the end of a horizontal shaft 61 and having a block 62 pivoted thereon which is received in slide ways 63 formed in the arm 57. The horizontal shaft 61 is driven by the crank shaft 34 through intermeshing bevel gears 65 and 66, respectively, secured to the shafts 34 and 61 and designed to rotate the shaft 61 at twice the speed of the shaft 34. With this construction the arm 57 is oscillated to impart two complete reciprocations to the welt guide for each rotation of the crank shaft 34. As will be noted from the drawings, the stationary arm 58 projects laterally from the head 35 and a spring 68 is coiled about the pivot of the arm 57 and connected to the two arms 57 and 58 in such a manner that the arm 57 is normally moved to elevate the slide 54.

The operation of the winding reel and cooperating welt guide is clearly evident from an inspection of Figs. 10 to 21, inclusive, of the drawings. It will be noted from Fig. 10 that the end of the strip of welting may be first clamped to the base of the winding post 26 and caused to pass about the winding post 27 in the opposite direction and thence through the welt guide. As the reel is then rotated in the direction of the arrow shown in Fig. 10 the welt guide is elevated from the position shown in Fig. 11 to that shown in Fig. 13 to elevate the welt strip above the path of the winding post 26 which passes thereunder through the continued rotation of the reel in the same direction. After the post 26 has passed beyond the welt strip and the reel has completed substantially one rotation the direction of movement of the reel is reversed, as shown in Fig. 14, and the welt guide in the meantime is lowered to again move the welt strip into the path of the post 26, causing the strip to be engaged by the post as shown in Fig. 16. As the rotation of the reel in this direction is continued the welt guide is again elevated to cause the welt strip to clear the post 27, as shown in Figs. 18 and 19, until the reel reaches substantially the position shown in Fig. 20 when the welt guide is lowered to cause the welt strip to engage behind the winding post 27 during the rotation of the reel in the opposite direction.

The welt prior to its passage through the guide 50 passes over a roll 70 journaled on the upper end of an upright 71. It is desirable to take up the slack of the welt which is caused by the reversal of movement of the winding reel and to this end a take-up member is arranged to act upon the welt between the roll 70 and the welt guide 50. As shown clearly in Figure 1 of the drawings an arm 72 is pivoted at 73 on the upright 71 and provided at its opposite end with a roll 74 which engages with the underside of the welt strip. This arm 72 is constantly acted upon by a spring 75 which tends to elevate the arm and raise the welt strip in the manner shown in Figures 15 and 21 of the drawings during that portion of the rotation of the reel in which the welt is given off.

It is desirable to automatically stop the operation of the machine when the end of the welt strip is reached and with this end in view welt engaging means are operatively connected with clutch controlling mechanism in such a manner that when the end of the strip of welting is reached the clutch is automatically disengaged and the machine stopped. A controller lever 80 is pivoted on a vertical slide 81 and when in the position shown in Figure 1 of the drawings the lower end of the lever engages with a stationary lug 82 formed upon the machine frame and serving to support the slide 81 in the position shown. A spring pressed plunger 83 slidingly received in a boss 84 formed upon the lever normally tends to swing the lower end of the lever outwardly to clear the stationary lug 82 through engagement of the end of the plunger 83 with the side of the frame. During the operation of the machine, however, the lever is normally retained in the position shown in Figure 1 by the strip of welting which passes between the roll 86 projecting laterally from the upper end of the lever and a cooperating roll 85 supported upon the upright 71. When the end of the strip of welting passes from between the two rolls the plunger 83 is allowed to rock the lower end of the lever outwardly, which permits the slide 81 to drop. This downward movement of the slide disconnects the driving clutch through suitable connections. As shown clearly in Figures 1 and 9 the slide 81 is provided with a plurality of longitudinal slots 88 which receive stationary guiding studs 89 secured in the upright 71. The lower end of the slide is pivotally connected to the outer end of an arm 90 secured to one end of a rock shaft 91 which carries a disc 92 having a cam slot 93 formed therein. This cam slot receives a pin 94 secured to a sliding clutch rod 95 which carries a drive pulley 97 on its opposite end. The drive pulley 97 is loosely journaled upon the sliding shaft 95 and is connected to a clutch disc 98 through a spring 99. The clutch disc 98 is provided with a laterally projecting pin 100 adapted to engage with a cooperating pin 101 secured in the side of a pulley 102. With this construction when the slide 81 is elevated the parts occupy the position shown in Figures 3 and 4 and the driving pulley 97 is operatively connected to the driven pulley 102. When the slide is dropped the clutch rod 95 is moved longitudinally a sufficient distance to disengage the driving pins 100 and 101 to break the connection between the two pulleys. It will be observed that the function of the yielding connection between the pulley 97 and the disc 98 is to minimize the shock when the driving pins 100 and 101 first engage upon starting the machine. In order to prevent undue tensioning of the spring 99 the driving pin 100 projects from the opposite side of the disc 98 in position to engage with one of the spokes of the driving pulley 97, as shown in Figures 1 and 3. The driven pulley 102 actuates the crank shaft 34 through a pulley 105 secured to the shaft and a belt 106 which passes over guide pulleys 107 and 108.

In order to permit the return of the slide 81 to its initial position with a welt engaged between the two rolls 85 and 86 it is essential to provide means for moving the controller lever laterally to cause the lower end to clear the lug 82. The controller lever 80 is provided with a handle 110 and the lever and handle are supported on a stud 111 secured to the slide 81 and normally held in the position shown in Figure 9 by a spring 112 received within the handle. By pulling the handle outwardly the lower end of the controller lever may be moved beyond the lug 82 even though the presence of a welt between the two rolls 85 and 86 prevents the lower end of the lever from being rocked outwardly.

At the completion of the winding operation the hank of welting may be readily removed from the reel by swinging one or both of the arms of the reel inwardly and moreover these arms are so arranged that an outward swinging movement of either arm serves to clamp the free end of the welt strip between the base of the arm and a cooperating clamping member. As shown in Figures 1 and 7, each arm is provided with a stud 115 swiveled within an upstanding sleeve 116 formed upon the base 25. The arm is provided with a skirt 117 arranged eccentrically to the swiveled stud 115 so that upon a rotation of the arm from the position shown in full lines in Figure 7 to that shown in dotted lines a bodily inward movement is imparted to each arm. This serves to decrease the effective diameter of the reel and permits the convenient removal of the hank of welting therefrom. In order to initially clamp the free end of the strip of welting to the base of the post a clamping member 118 having a corrugated face is arranged to cooperate with the lower portion of the skirt 117 when the arm is swung outwardly. In order to normally retain each arm in an outward position the sleeve 116 is provided with a recess 120 at the top edge which receives a corresponding projection 121 formed upon the arm when the latter is located in the outward or welt clamping position. The engagement of the lug 121 in the recess 120 is maintained by a spring 122 surrounding the lower end of the swivel post 115 and interposed between a collar 123 secured to the post and the upper end of a recess formed in the sleeve 116. In order to facilitate the elevating of the hank from the reel after it has been collapsed the base 25 is provided with a depressed central portion 125 which permits the insertion of the fingers or hand between the base and the hank of welting.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. A winding machine having, in combination, a winding reel including a plurality of arms, means for rotating the reel alternately in opposite directions, a guide, and means for relatively actuating the guide and reel in the direction of the axis of the reel to move a strip of material periodically out of the path of one of the arms.

2. A welt winding machine having, in combination, a winding reel including a plurality of arms, means for rotating the reel alternately in opposite directions, a welt guide, and means for actuating the guide to move a welt strip carried thereby out of the path of an arm when the reel is moving in one direction and into the path of the arm when the reel is moving in the opposite direction.

3. A welt winding machine having, in combination, a winding reel having a pair of arms extending substantially parallel to the axis of the reel, a welt guide, and mechanism for relatively actuating the welt guide and reel constructed and arranged to coil a strip of welting about the arms in a series of superimposed convolutions each having the form of a figure 8.

4. A winding machine having, in combination, a winding reel having a pair of arms, means for rotating the reel alternately in opposite directions, a guide, and means for actuating the guide to cause a strip of stock to be successively coiled in opposite directions about the two arms.

5. A welt winding machine having, in combination, a reel provided with a pair of arms extending substantially parallel to the axis of the reel, means for rotating the reel, and means for actuating a strip of welting constructed and arranged to coil the welt successively in opposite directions about the two arms.

6. A welt winding machine having, in combination, a reel provided with two arms, means for rotating the reel, a welt guide, means for actuating the welt guide to move a welt strip out of the path of one of the arms during the rotation of the reel and for thereafter moving the welt strip into the path of the arm, and means for reversing the rotation of the reel to cause the arm to engage with the welt strip and wind the latter upon the reel.

7. A welt winding machine having, in combination, a reel provided with a pair of winding arms, means for rotating the reel alternately in opposite directions, a welt guide, and means for reciprocating the welt guide in timed relation to the movements of the reel to wind a strip of welting upon the reel in the form of a figure 8.

8. A winding machine having, in combination, a reel provided with a pair of winding arms, means for clamping the end of a strip of stock to one of the arms, means for rotating the reel in opposite directions, a stock guide, and means for moving the guide axially of the reel in timed relation to the rotation of the reel to wind the strip of stock thereon in the form of a figure 8.

9. A welt winding machine having, in combination, a vertical shaft, a reel supported upon the upper end of the shaft provided with a pair of arms, means for imparting substantially a complete rotation to the reel in one direction and for thereafter returning the reel to initial position, a welt guide, and mechanism for reciprocating the guide axially of the reel in timed relation to the rotation of the reel.

10. A welt winding machine comprising a reel, a pair of oppositely disposed driving cranks, means for continuously rotating the cranks in the same direction, and connections between the cranks and reel adapted to rotate the reel alternately in opposite directions and at a uniform speed.

11. A welt winding machine having, in combination, a winding reel, means for rotating the reel alternately in opposite directions, a welt guide, and a take-up mechanism acting upon a welt strip and adapted to maintain the strip taut during the rotation of the reel.

12. A welt winding machine having, in combination, a winding reel, means for rotating the reel in opposite directions, a welt guide, means for reciprocating the welt guide, and a take-up mechanism acting upon a welt strip in advance of the guide and adapted to maintain the strip taut.

13. A welt winding machine having, in combination, a winding reel provided with a plurality of arms, means for rotating the reel in opposite directions about a vertical axis, a welt guide supported at one side of the reel, and means for reciprocating the welt guide in the direction of the axis of the reel and in timed relation to the movements of the reel.

14. A welt winding machine having, in combination, a vertical shaft, a winding reel supported upon the upper end of the shaft, a crank shaft disposed at one side of the reel shaft and having a pair of oppositely disposed driving cranks, connections between the crank and the reel shaft for rotating the reel in opposite directions, a welt guide, and connections between the welt guide and crank shaft for imparting two complete reciprocations to the welt guide for each rotation of the crank shaft.

15. A winding machine comprising a shaft, a winding reel supported upon the shaft, a second shaft having oppositely disposed driving cranks, means for rotating the shaft, two cams mounted upon the reel shaft, and a strap connecting each driving crank with a cam upon the reel shaft to rotate the reel in opposite directions at a uniform speed.

16. A winding machine having, in combination, a winding reel, a stock guide, and mechanism for moving the reel on its axis and moving the guide to coil a hank of stock upon the reel in a series of loops each having the form of a figure 8 with the intersection of the loops substantially coincident with the axis of the reel 17. A winding machine having, in combination, a winding reel, a stock guide, and mechanism for moving the reel on its axis relatively to the guide to coil a hank of stock upon the reel in a series of loops each having the form of a figure 8 lying in a plane substantially normal to the axis of the reel.

JAMES A. BROGAN.